(12) United States Patent
Yalamanchili

(10) Patent No.: US 10,880,431 B2
(45) Date of Patent: *Dec. 29, 2020

(54) SENDING NOTIFICATIONS BASED ON AN ACTIVE MODE OF OPERATION OF A MOBILE DEVICE

(71) Applicant: T-Mobile USA, Inc., Bellevue, WA (US)

(72) Inventor: Kalyan C. Yalamanchili, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,784

(22) Filed: Jan. 23, 2019

(65) Prior Publication Data

US 2019/0158661 A1    May 23, 2019

Related U.S. Application Data

(63) Continuation of application No. 15/282,709, filed on Sep. 30, 2016, now Pat. No. 10,194,025.

(51) Int. Cl.
*H04M 3/42* (2006.01)
(52) U.S. Cl.
CPC .... *H04M 3/42374* (2013.01); *H04M 3/42195* (2013.01); *H04M 2203/651* (2013.01)
(58) Field of Classification Search
CPC ....... H04M 2203/651; H04M 3/42195; H04M 3/42374; H04M 2203/20; H04M 2203/35; H04M 3/561; H04M 3/567

USPC .......................................................... 370/259
See application file for complete search history.

(56) References Cited

U.S. PATENT DOCUMENTS

| | | | |
|---|---|---|---|
| 6,792,296 B1 * | 9/2004 | Van Bosch | H04M 1/6083 455/569.2 |
| 7,515,904 B2 | 4/2009 | Okon et al. | |
| 8,032,161 B2 | 10/2011 | Benco et al. | |
| 8,385,884 B1 * | 2/2013 | Hertzfeld | H04M 1/72566 455/411 |
| 8,527,287 B1 * | 9/2013 | Bhatia | G06Q 10/109 705/1.1 |

(Continued)

FOREIGN PATENT DOCUMENTS

IN    201631027043    *    8/2016    ........ H04M 3/42374

OTHER PUBLICATIONS

U.S. Appl. No. 15/282,709 (U.S. Pat. No. 10,194,025), filed Sep. 30, 2016; titled Sending Notifications Based on an Active Mode of Operation of a Mobile Device.

(Continued)

*Primary Examiner* — Robert J Lopata
(74) *Attorney, Agent, or Firm* — Perkins Coie LLP

(57) ABSTRACT

Systems and methods are described herein for sending notifications associated with different use or active modes of a mobile device, such as a smart phone, tablet, and so on. For example, a mobile device may be in a busy mode, where a user associated with the mobile device is busy on a call, and/or in an entertainment mode (or other non-communication mode), where the user is utilizing entertainment functions provided by the mobile device (e.g., watching a video, playing a video game, listening to a podcast, and so on).

20 Claims, 6 Drawing Sheets

(56) References Cited

U.S. PATENT DOCUMENTS

| | | | | |
|---|---|---|---|---|
| 8,675,841 B2* | 3/2014 | Kahn | ................ | H04M 3/42042 379/114.21 |
| 10,194,025 B2 | 1/2019 | Yalamanchili | | |
| 2003/0039339 A1* | 2/2003 | Luehrig | ............. | G06Q 30/0258 379/88.13 |
| 2003/0112948 A1* | 6/2003 | Brown | .............. | H04M 3/42008 379/207.04 |
| 2004/0235462 A1 | 11/2004 | Lasken et al. | | |
| 2005/0260975 A1* | 11/2005 | Chen | ................... | H04M 1/2535 455/415 |
| 2006/0078105 A1* | 4/2006 | Korn | ..................... | H04M 1/663 379/210.02 |
| 2007/0010292 A1* | 1/2007 | Vetelainen | ............... | H04M 1/57 455/566 |
| 2007/0042801 A1* | 2/2007 | Miyata | .................. | H04L 12/189 455/550.1 |
| 2007/0201634 A1* | 8/2007 | Bonnaud | ........... | H04M 3/42017 379/88.13 |
| 2008/0056466 A1* | 3/2008 | Nishimura | ............ | H04M 1/642 379/88.22 |
| 2008/0063181 A1* | 3/2008 | Khouri | ................ | H04M 1/6505 379/373.02 |
| 2008/0064423 A1* | 3/2008 | Tsai | .................. | H04M 1/72552 455/466 |
| 2010/0099398 A1* | 4/2010 | Bauchot | ............. | G06K 7/10079 455/422.1 |
| 2010/0190474 A1* | 7/2010 | Rajguru | ................ | H04W 12/08 455/412.1 |
| 2010/0246785 A1* | 9/2010 | Wang | ................ | H04M 1/72583 379/88.23 |
| 2010/0246791 A1* | 9/2010 | Wang | ................ | H04M 3/42195 379/201.02 |
| 2010/0273447 A1* | 10/2010 | Mann | ................ | H04M 1/72519 455/405 |
| 2010/0279666 A1* | 11/2010 | Small | .................... | H04M 1/576 455/414.1 |
| 2011/0177800 A1* | 7/2011 | Gilson | .................... | H04W 4/12 455/417 |
| 2012/0009906 A1* | 1/2012 | Patterson | ................ | H04W 4/20 455/414.1 |
| 2013/0122873 A1 | 5/2013 | Song et al. | | |
| 2013/0216039 A1* | 8/2013 | Mairs | .................... | H04M 3/424 379/265.13 |
| 2013/0237287 A1* | 9/2013 | Ferren | ...................... | H04W 4/16 455/566 |
| 2014/0047001 A1* | 2/2014 | Phillips | .................. | H04L 65/403 709/202 |
| 2015/0006638 A1* | 1/2015 | Jain | ........................ | G06Q 10/10 709/204 |
| 2015/0195399 A1* | 7/2015 | Way | ........................ | H04W 4/50 455/418 |
| 2015/0205861 A1* | 7/2015 | Gamble | .................. | H04W 4/12 707/689 |
| 2015/0215464 A1* | 7/2015 | Shaffer | ................ | H04M 3/5238 379/266.06 |
| 2015/0271110 A1* | 9/2015 | Murray | .................... | H04L 51/02 455/414.1 |
| 2015/0312416 A1* | 10/2015 | Cahill | .................. | H04M 3/5166 379/266.01 |
| 2015/0373173 A1* | 12/2015 | Taher | ................ | H04M 1/72519 370/328 |
| 2016/0173683 A1* | 6/2016 | Abreu | ..................... | H04L 51/24 455/414.1 |
| 2016/0212266 A1* | 7/2016 | Soundar | ............. | H04M 3/5235 |
| 2016/0277570 A1* | 9/2016 | Marya | ................ | H04M 3/42374 |
| 2016/0279501 A1* | 9/2016 | Jang | ........................ | H04Q 9/00 |
| 2016/0286045 A1* | 9/2016 | Shaltiel | .................... | H04M 3/48 |
| 2016/0345171 A1* | 11/2016 | Kulkarni | ........... | H04M 3/42042 |
| 2017/0039877 A1* | 2/2017 | Gimenez Molinelli | ..................... | G16H 50/30 |
| 2017/0237702 A1* | 8/2017 | Karimli | .................... | H04L 51/04 709/206 |
| 2018/0041632 A1* | 2/2018 | Peethambaran | .. | H04M 3/42374 |
| 2018/0097934 A1 | 4/2018 | Yalamanchili | | |
| 2018/0097935 A1 | 4/2018 | Yalamanchili | | |
| 2019/0158654 A1* | 5/2019 | Way | ..................... | H04L 43/045 |

OTHER PUBLICATIONS

U.S. Appl. No. 15/282,779, filed Sep. 30, 2016; titled Sending Notifications Based on a Busy Mode of Operation of a Mobile Device.

* cited by examiner

SENDING NOTIFICATIONS BASED ON AN ACTIVE MODE OF OPERATION OF A MOBILE DEVICE

CROSS-REFERENCE TO RELATED APPLICATIONS

This application is a continuation of U.S. patent application Ser. No. 15/282,709 filed Sep. 30, 2016 and entitled SENDING NOTIFICATIONS BASED ON AN ACTIVE MODE OF OPERATION OF A MOBILE DEVICE, now U.S. Pat. No. 10,194,025; which is related to U.S. patent application Ser. No. 15/282,779, filed Sep. 30, 2016, and entitled SENDING NOTIFICATIONS BASED ON A BUSY MODE OF OPERATION OF A MOBILE DEVICE, both of which are hereby incorporated by reference in their entireties.

BACKGROUND

Typically, when a user of a mobile device receives a call while the user is already on a call (e.g., the line is busy), the user ignores the call, or sends a text message to the calling party indicating he/she is busy on another call. Often, however, the calling party and the user do not connect, because the calling party is unaware as to when the user becomes available, the user forgets to call back the calling party, and so on.

In addition, the user of the mobile device (e.g., a smart phone) often receives one or more calls at times when he/she is using the mobile device in various non-communication modes. For example, the user may be playing a movie, listening to a podcast, playing a video game, or otherwise being entertained by content presented by the mobile device, when a call is received at the mobile device.

BRIEF DESCRIPTION OF THE DRAWINGS

Embodiments of the disclosed technology will be described and explained through the use of the accompanying drawings.

Figure 1:
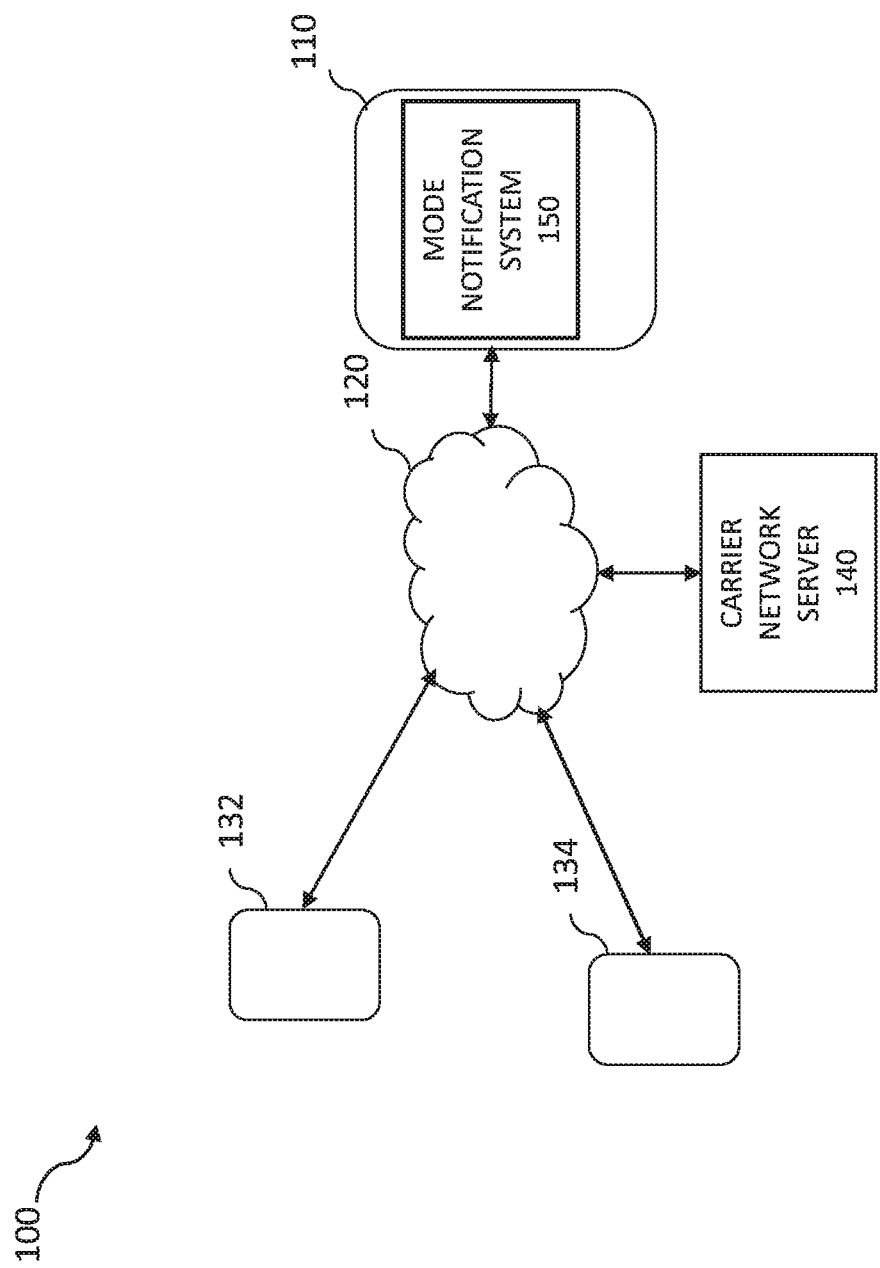
FIG. 1 is a block diagram illustrating a suitable computing environment for generating and/or sending notifications based on operational modes of mobile devices.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for sending notifications associated with different use or active modes of a mobile device, such as a smart phone, tablet, and so on. For example, a mobile device may be in a busy mode, where a user associated with the mobile device is busy on a call, and/or in an entertainment mode (or other non-communication mode), where the user is utilizing entertainment functions provided by the mobile device (e.g., watching a video, playing a video game, listening to a podcast, and so on).

When a voice call is received at the called mobile device during one of these use or active modes, the systems and methods generate and provide one or more notifications associated with the use mode of the called mobile device to a party that initiated the voice call (the "calling party"), such as notifications that indicate the current use mode of the called mobile device, notifications that indicate when the called mobile device is no longer in the current use mode (e.g., the device is no longer busy or presenting a video), and so on.

In some embodiments, the systems and methods notify the calling party of a use mode of operation of a mobile device called by the calling party, by receiving a voice call initiated by a calling mobile device associated with the calling party and determining that the mobile device is currently operating in a busy mode. The busy mode of the mobile device is associated with the mobile device being on a previously connected voice call with a different calling party.

Upon the determination, the systems and methods send to the calling mobile device a first notification during the busy mode of operation of the called mobile device, where the notification indicates the current busy mode of operation of the called mobile device. When the busy mode of operation of the called mobile device ends, the systems and methods send a second notification to the calling mobile device that indicates the called mobile device is available to receive voice calls (e.g., is no longer in the busy mode of operation).

For example, a mobile device may include a notification system, which contains a call reception module that receives a call placed to the mobile device by a second mobile device, a mode determination module that determines the mobile device is currently operating in a busy mode of operation, and a notification module that sends a notification to the second mobile device when the mobile device changes its mode of operation from the busy mode of operation to an available mode of operation.

In some embodiments, the systems and methods notify calling parties about a current mode of operation of the called mobile device, by receiving, at the called mobile device, a voice call initiated by the calling mobile device associated with the calling party, and determining that the called mobile device is currently operating in a non-communication mode of operation, such as an entertainment mode of operation that presents entertainment content to a user of the called mobile device. When the non-communication mode of operation of the called mobile device ends, the systems and methods send a notification to the calling mobile device that indicates the called mobile device is available to receive voice calls.

For example, a notification system receives indications of calls placed to the called mobile device by other mobile devices, determines the called mobile device is operating in an entertainment mode of operation, and sends notifications to the other mobile devices when the called mobile device has finished operating in the entertainment mode of operation.

The systems and methods, therefore, enable mobile devices to inform calling parties when their mobile devices are no longer busy or presenting content and are therefore available to communicate with the calling parties on voice calls or other multimedia calls (e.g., video calls). Further, by sending notifications that update the status of the operation mode of their mobile device, the mobile devices enable their associated users to track and connect to other users attempting to reach them with limited frustration or annoyance, among other benefits.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

As described herein, the systems and methods facilitate sending notifications and other messages between mobile devices, in order to inform various calling parties as to the status or operational modes of called devices when called parties receive calls and are unable to connect with calling parties. FIG. 1 is a block diagram illustrating a suitable computing environment 100 for generating and/or sending notifications based on operational modes of called mobile devices.

A mobile device 110 includes a mode notification system 150 that is configured to identify or determine various different modes of operation of the mobile device (e.g., a busy mode of operation, an entertainment mode of operation, and so on), and send notifications to various calling parties.

For example, when a user associated with the mobile device 110 is busy on a voice call, the mobile device may receive voice calls initiated by various calling parties, such as calling parties associated with mobile devices 132 and/or 134, which initiate and place voice calls to the mobile device 110 over a telecommunications network 120.

Upon receiving the voice calls, the system 150, having knowledge that the mobile device is in a busy mode or non-communication mode (e.g., is not available to receive voice calls), sends notifications to the calling mobile devices 132, 134. The system 150 may automatically send notifications that indicate the current busy mode of operation of the mobile device 110 and/or that inform the calling mobile devices 132, 134 when the mobile device 110 is available and no longer in the busy mode of operation (e.g., the associated user has ended the previous voice call).

Although the mode notification system 150 is depicted in FIG. 1 as being contained by the mobile device 110, some or all aspects may be implemented or performed within the network 120, such as via a network server 140 that is part of a network carrier that provides the network 120 and/or includes the user of the mobile device 110 as a subscriber of telecommunications services.

FIG. 1 and the discussion herein provide a brief, general description of the components of the computing environment 100. Although not required, aspects of the computing environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 110 may include network communication components that enable the devices to communicate with remote servers or other portable electronic devices by transmitting and receiving wireless signals using a licensed, semi-licensed, or unlicensed spectrum over communications network, such as the network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing LTE, 3G and/or 4G wireless protocols. If the mobile device 110 is configured to communicate over another communications network, the mobile device 110 may include other components that enable it to be identified on the other communications networks.

In some embodiments, the mobile device 110 may include components that enable them to connect to a communications network using Generic Access Network (GAN), Unlicensed Mobile Access (UMA), or LTE-U standards and protocols. For example, the mobile device 110 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE) network, or other communications network. Further, the communications network 120 may include or be part of a wireless communications network, such as an Internet Multimedia System (IMS) network or other wireless networks.

Examples of the Mode Notification System

Figure 2:
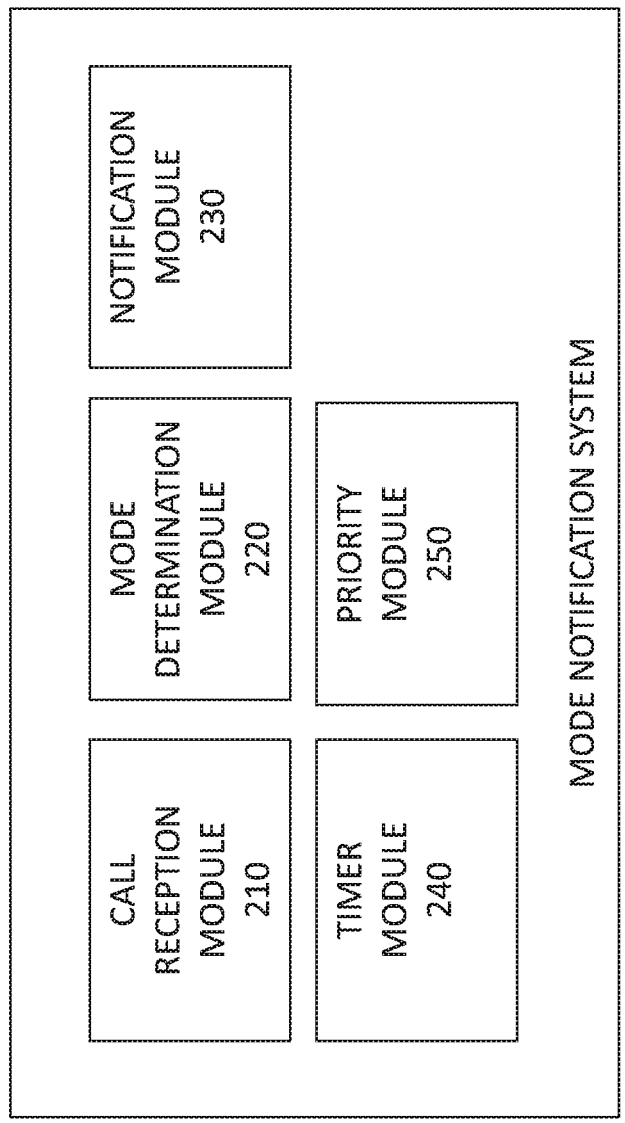
FIG. 2 is a block diagram illustrating the components of a mode notification system.

FIG. 2 is a block diagram illustrating the components of the mode notification system 150, which may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the mode notification system 150 may include a call reception module 210, a mode determination system, a notification module 230, a timer module 240, and a priority module 250.

In some embodiments, the call reception module 210 is configured and/or programmed to receive or otherwise access a call, or an indication of a call, placed to the mobile device by other mobile devices, such as one or more calling mobile devices that initiate voice calls to the mobile device. For example, the call reception module 210 may access a call log stored by the mobile device 110. The call log may store information identifying "missed" or uncompleted calls, calls rejected or declined by the user of the mobile device 110, and so on.

The call reception module 210, therefore, may determine whether a call has been received by the mobile device 110 and unanswered, a call has been received by the mobile device 110 and declined by the user, a text has been sent by the user to the calling mobile device, and so on.

In some embodiments, the mode determination module 220 is configured and/or programmed to identify or determine a current mode of operation for the mobile device 110. For example, the mode determination module 220 may determine the mobile device 110 is currently operating in a busy mode of operation (e.g., the user is on an active call), is currently operating in an entertainment mode or other non-communication mode of operation (e.g., the user is consuming content played by a video replay application on the mobile device, the user is playing a video game facilitated by the mobile device 110, and so on).

The module 220 may access activity logs maintained by an operating system of the mobile device 110 in order to determine the current mode of operation. For example, the module 220 may determine that a VOIP application is currently active, and determine the mobile device 110 is in the busy mode of operation, and/or may determine a streaming media application is streaming content via the mobile device 110, and determine the mobile device 110 is thus in the entertainment mode of operation.

In some embodiments, the notification module 230 is configured and/or programmed to send a notification or notifications to the other mobile devices when the mobile device ends the current mode of operation and becomes available (e.g., is operating in an available mode of operation). For example, the notification module 230 may determine a currently active voice call or video has ended, and send or transmit a notification to the calling parties associated with the other mobile devices that indicates the mobile device 110 is available to receive, accept, complete, or connect to a voice call initiated by the other mobile devices.

The notification module 230 may include user-defined settings that identify which calling parties are to receive notifications. For example, the user may select a setting where all calling parties known to the user (e.g., within the user's contact list) receive notifications, whereas unknown calling parties do not receive notifications. As another example, the user may select a subset of known calling parties as notification recipients.

Furthermore, the notification module 230 may provide a user with the option of dynamically determining whether to send a notification when a call is received and unanswered during a busy or entertainment mode of operation. For example, the notification module 230 may display information about the calling party, and request the user choose an option of sending a notification or not (e.g., regardless of default settings for the calling party).

In some cases, the notification module 230 may send other notifications, such as notifications when the mobile device 110 received the initiated voice calls and was determined to be unavailable. For example, the notification module 230 may send or transmit notifications that indicate the current status of the mobile device 110 (e.g., the device is busy, or playing a movie) during or soon after the received call. Further details regarding the type and content of notifications are described herein.

The mode notification system 150 may also include various modules that assist in sending notifications when the mobile device 110 is determined to be available for receiving voice calls, and/or that assist in sending notifications in various determined orders of priority when the mobile device 110 receives multiple different voice calls from various different mobile devices, such as devices 132, 134.

In some embodiments, the timer module 240 is configured and/or programmed to set and implement various timing mechanisms that trigger when notifications are sent to calling mobile devices after the mobile device 110 becomes available to receive voice calls. For example, the timer module 110 may set a predetermined time period (e.g., 1, 2, or 5 minutes) of waiting, in order to ensure that the mobile device 110 is likely to be available when the notification is sent. The time period, which may be configured by the user, enables the system 110 to reduce false determinations of availability, such as when a user ends one call and immediately begins another call.

The timer module 240 may also determine or select a time period at which to send the notification based on information obtained from various applications stored on the mobile device 110. For example, the timer module 240 may access a calendar application, an email application, and so on, to determine whether the user of the mobile device 110 is scheduled with another call or activity, or is likely to be available when the notification is sent to the calling party.

In some embodiments, the priority module 250 is configured and/or programmed to determine or select a priority of notifying calling parties when multiple calls are received by the mobile device 110 when the mobile device is unavailable. The priority module 250 may utilize various different selection rules in determining and assigning priority to the calling parties.

For example, given a scenario where the mobile device 110 receives and decline 4 different calls from three different calling parties (e.g., caller A (colleague) places the first call, caller B (wife) places the second call, caller B again places a call (the third call), and caller C (unknown) places the 4th call), the following priority rules may be applied when determining and assigning an order of priority to the calling parties for sending notifications:

A first in first out (FIFO) rule: Notifications are sent to the calling parties based on the order in which they placed calls to the mobile device 110. Following the example, the order of notification is caller A, caller B, caller B again (if they haven't subsequently called back, and caller C;

A frequency rule: Notifications are sent to the calling parties based on the number of calls placed to the mobile device 110 (while the called device is busy, or during another time period, such as within the last week). Under this rule, any ties are broken by then using the FIFO rule. Following the example, the order of notification is caller B, caller A, and then caller C.

A contact rule: Notifications are sent to the calling parties based on their placement within the user's contact list, favorites list, and/or other groupings of contacts. Following the example, the order of notification is caller B, caller A, and caller C. Of course, other rules or logic of prioritization may be implemented by the priority module 250.

Thus, in some embodiments, the mode notification system 150 utilizes various modules to access calls, determine the mode of operation of the mobile device 110, and send notifications to calling parties at times and with assigned priorities that target a likely probability of the device 110 being available to the calling party upon receipt of a subsequence call placed to the mobile device 110 (e.g., after the notification is received by the calling party).

As discussed herein, the mobile device 110 may be unavailable for a variety of reasons such as when the user of the mobile device 110 is busy on a voice call, when the user of the mobile device 110 is consuming content or otherwise utilizing the mobile device 110 for entertainment, and so on. The following sections describe various methods performed by the mode notification system 110 during these modes of operations.

Examples of Busy Mode Notifications

Figure 3:
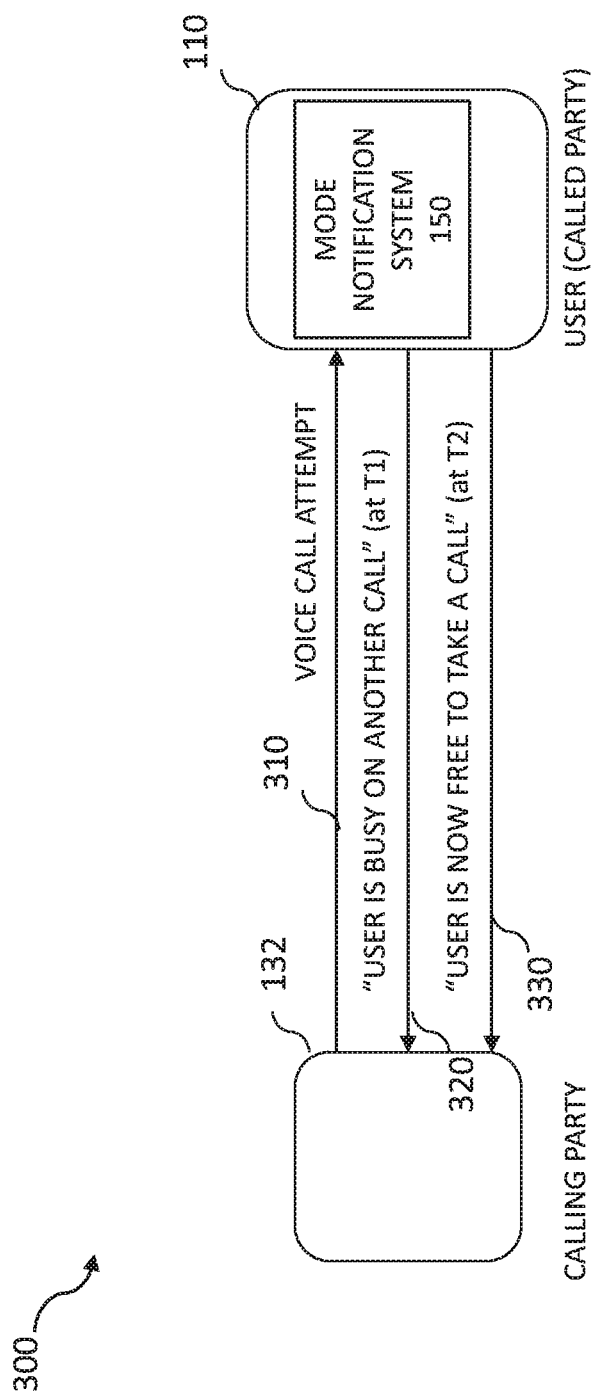
FIG. 3 is a diagram illustrating notifications sent to a calling party from a busy mobile device.

As described herein, during a busy mode of operation, the mobile device 110, upon receiving an incoming call, and declined or otherwise not accepting the call, may send to the calling party one or more notifications that provide information regarding a current status of the mobile device 110. FIG. 3 is a diagram 300 illustrating notifications sent to a calling party from a busy mobile device.

As depicted, mobile device 110 receives an incoming call 310 initiated by the calling mobile device 132. After determining the device 110 is in busy mode (as described herein), the mode notification system 150, at a time T1 (a time period during which the user is busy on a call) sends a notification 320 indicating the mobile device 110 is in the busy mode of operation (e.g., "user is busy on another call"). Later, after the current call terminates and the mobile device 110 is available to receive calls, the system 150 automatically sends, at a time T2 (where T2 is after T1), a notification 330 indicating the mobile device 110 is available to receive calls (e.g., "user is now free to take a call").

Figure 4:
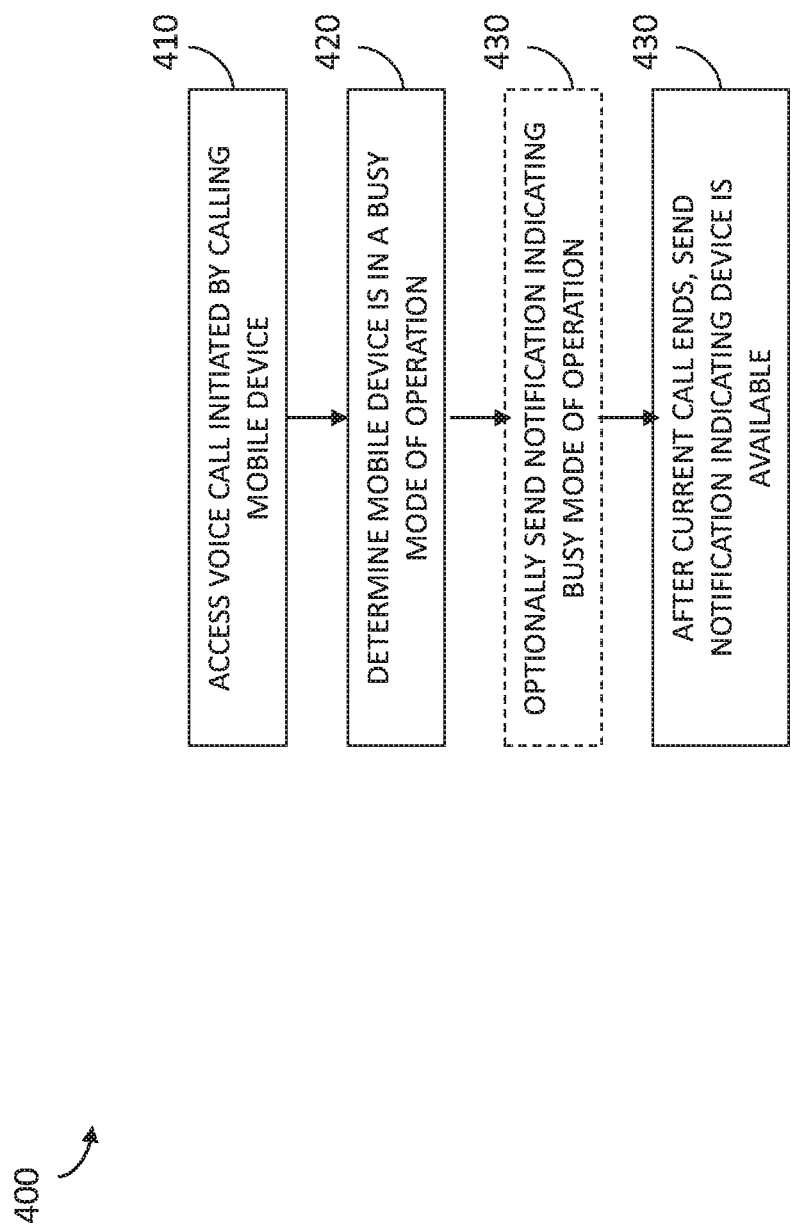
FIG. 4 is a flow diagram illustrating a method for notifying a calling party of a busy mode of a mobile device.

FIG. 4 is a flow diagram illustrating a method 400 for notifying a calling party of a busy mode of a mobile device. The method 400 may be performed by the mode notification system 150 and, accordingly, is described herein merely by way of reference thereto. It will be appreciated that the method 400 may be performed on any suitable hardware.

In operation 410, the system 150 receives or otherwise accesses a voice call initiated by a calling mobile device associated with a calling party. For example, the call reception module 210 may determine whether a call has been received by the mobile device 110 and unanswered, whether a call has been received by the mobile device 110 and declined by the user, whether a text has been sent by the user to the calling mobile device, and so on.

In operation 420, the system 150 determines that the mobile device is currently operating in a busy mode, where the busy mode of the mobile device is associated with the mobile device facilitating a previously connected voice call between a user associated with the mobile device and another party different from the calling party. For example, the mode determination module 220 may access activity logs maintained by an operating system of the mobile device 110 in order to determine the current mode of operation.

Optionally, in operation 430, the system 150 sends a first notification during the busy mode of operation of the mobile device to the calling mobile device associated with the calling party that indicates the current busy mode of operation of the mobile device. For example, the notification module 230 may send or transmit notifications that indicate the busy status of the mobile device 110.

In operation 440, when the busy mode of operation of the mobile device ends, the system 150 (automatically) sends a second notification to the calling mobile device associated with the calling party that indicates the mobile device is available to receive voice calls. For example, the notification module 230 may determine a currently active voice call has ended, and send or transmit a notification to the calling party that indicates the mobile device 110 is available to receive, accept, complete, or connect to a voice call initiated by the calling mobile device.

As described herein, the system 150 may automatically send the various notifications to the calling party as the mode of operation changes (e.g., changes from busy to available). The system 150, in some cases, may facilitate user customization of the content, frequency, or timing of the notifications. For example, a user of the mobile device 110 may select a specific notification to send when available to receive calls (e.g., "Please call me back, the line is now free"), may select a certain timing mechanism at which to send the notifications (e.g., 1 or 3 minutes after ending a previous call), may select a frequency of sending notifications to the calling party before a call is connected between the parties (e.g., send a notification every 5 minutes, up to 3 total notifications), and so on.

In addition, the system 150, in some embodiments, may send local or user-specific notifications to the user of the mobile device 110. For example, the notification module 230 may, when the busy mode of operation of the mobile device ends, present or display a local notification to the user that indicates the calling party initiated the voice call to the mobile device during the busy mode of operation of the mobile device. By notifying both parties, the system 150, in some cases, enhances the likelihood that a voice call is ultimately connected.

The notification module 230 may send notifications to calling parties over a variety of different communication protocols or mechanisms. When the call is received via the phone application of the mobile device, the notification module 230 may send the notification via a text message to the phone number associated with the calling mobile device. However, when a call is received via one or more VOIP or social media applications, the notification module 230 may send the notification to the username (e.g., "@callinguser234") that initiated the voice call as a chat or instant message within the social media application. Of course other messaging mechanisms may be used, such as sending a notification under the Session Initiated Protocol (SIP).

As described herein, the system 150, upon receiving multiple calls during a busy mode of operation of the mobile device 110, may send notification based on one or more priorities assigned to the calling parties. For example, the system 150 may assign a response priority to each calling party of multiple additional calling parties that is based on a variety of factors or criteria (described herein), and sending the notifications that indicate the mobile device is available to receive voice calls to each calling party of the multiple additional calling parties based on the assigned response priorities.

Thus, in some embodiments, the mobile device 110 receives a call placed to the mobile device by a second mobile device, determines the mobile device is currently operating in a busy mode of operation, and sends a notification to the second mobile device when the mobile device changes a mode of operation from the busy mode of operation to an available mode of operation.

Examples of Non-Communication Mode Notifications

Figure 5:
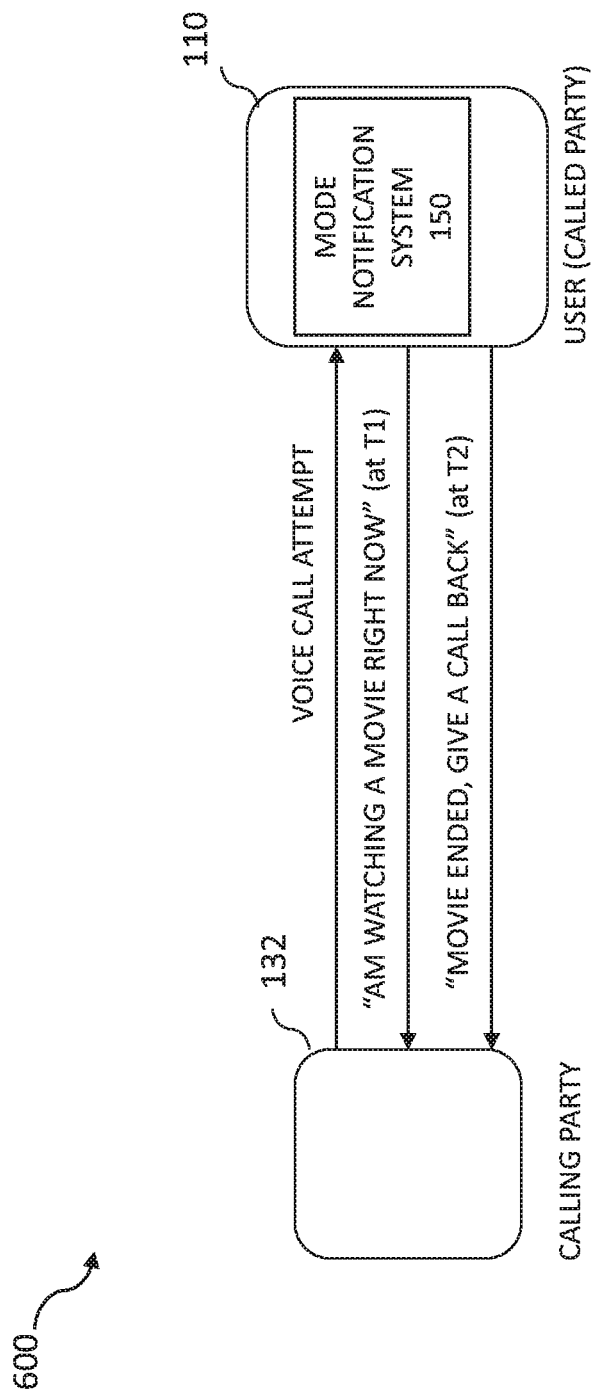
FIG. 5 is a diagram illustrating notifications sent to a calling party from a mobile device in entertainment mode.

As described herein, during an entertainment mode or other non-communication mode of operation, the mobile device 110, upon receiving an incoming call (and, likely not noticing the incoming call), may send to the calling party one or more notifications that indicates the mobile device 110 is current being used to present content or otherwise perform non-communication functions for the user. FIG. 5 is a diagram 500 illustrating notifications sent to a calling party from a mobile device in entertainment mode.

As depicted, mobile device 110 receives an incoming call 510 initiated by the calling mobile device 132. After determining the device 110 is in entertainment mode (as described herein), the mode notification system 150, at a time T1 (a time period during which the user is busy on a call) sends a notification 520 indicating the mobile device 110 is in the entertainment mode of operation (e.g., "hey, I am watching a movie right now") Later, after the content presentation ends and the mobile device 110 is available to receive calls, the system 150 automatically sends, at a time T2 (where T2 is after T1), a notification 530 indicating the mobile device 110 is available to receive calls (e.g., "movie ended, give me a call").

Figure 6:
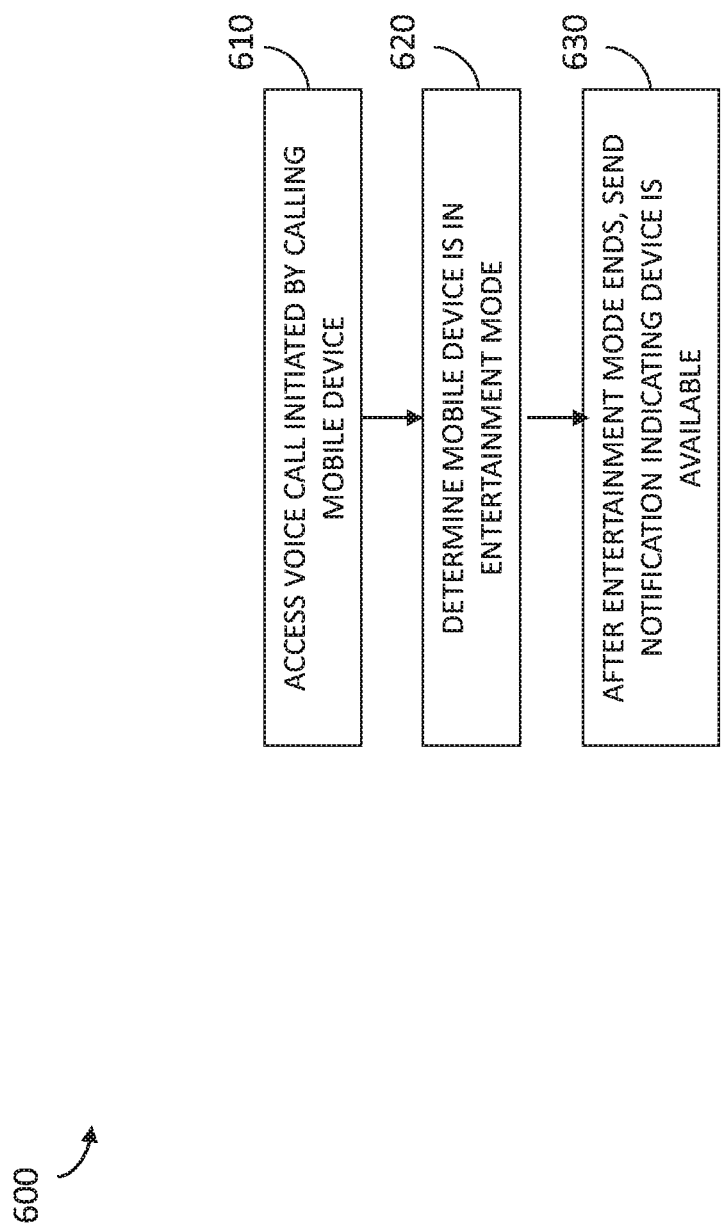
FIG. 6 is a flow diagram illustrating a method for notifying a calling party of an entertainment mode of a mobile device.

FIG. 6 is a flow diagram illustrating a method 600 for notifying a calling party of an entertainment mode of a mobile device. The method 600 may be performed by the mode notification system 150 and, accordingly, is described herein merely by way of reference thereto. It will be appreciated that the method 600 may be performed on any suitable hardware.

In operation 610, the system 150 receives a voice call initiated by a calling mobile device associated with the calling party. For example, the call reception module 210 may determine whether a call has been received by the mobile device 110 and unanswered, whether a call has been received by the mobile device 110 and declined by the user, whether a text has been sent by the user to the calling mobile device, and so on.

In some cases, the system 150 may present an alert to the user that indicates the incoming call is being received by the mobile device 110. For example, the system 150 may present, in a small window or area proximate to a display of content (e.g., at the top of a display screen) being presented to the user via the mobile device 110, that the call is currently being received.

In operation 620, the system 150 determines that the mobile device is currently operating in a non-communication mode of operation, where the non-communication mode of operation the mobile device is associated with the mobile device presenting content to a user of the mobile device. For example, the mode determination module 220 may access activity logs maintained by an operating system of the mobile device 110 in order to determine the current mode of operation.

As described herein, the non-communication mode of operation may be any mode of operation that is not associated with voice calling, such as modes of operation associated with entertaining or presenting content to the user. Example non-communication modes of operation include:
  Presenting a movie or other video content via a media player of the mobile device;
  Presenting streaming audio, podcasts, or other audio content via a media player of the mobile device;
  Facilitating the playing of a video game for the user via the mobile device;
  Monitoring or tracking an activity currently being performed by the user;
  Capturing audio or video using one or more cameras of the mobile device;

A user engaging with an active application of the mobile device; and so on.

In operation 630, when the non-communication mode of operation of the mobile device ends, the system 150 sends a notification to the calling mobile device associated with the calling party that indicates the mobile device is available to receive voice calls. For example, the notification module 230 may determine a content presentation has ended, and send or transmit a notification to the calling party that indicates the mobile device 110 is available to receive, accept, complete, or connect to a voice call initiated by the calling mobile device.

As described herein, the system 150 may send notifications during the entertainment mode to provide information to the calling party regarding the current status (e.g., mode of operation), of the mobile device 110. The system 150 may estimate a remaining duration of the current non-communication mode of operation by using APIs of the video playback application, and send a notification to the calling mobile device associated with the calling party that indicates the current non-communication mode of operation of the mobile device and the estimated remaining duration. For example, the system 150 may determine the user is watching a movie, and send a notification that indicates the remaining run time of the movie (e.g., "I am watching a movie right now that will end in 37 minutes).

The system 150 may also determine or identify the current non-communication mode of operation, and send a notification to the calling mobile device associated with the calling party that indicates the current non-communication mode of operation of the mobile device and that presents information associated with the content presented to the user during an entertainment mode of operation. For example, the system 150 may determine the user is watching a movie, and send a notification that indicates the identity of the movie (e.g., "I am watching Superman Returns right now, will let you know when done").

Further, as described herein, the system 150, upon receiving multiple calls during an entertainment mode of operation for the mobile device 110, may send notifications based on one or more priorities assigned to the calling parties. For example, the system 150 may assign a response priority to each calling party of multiple additional calling parties that is based on a variety of factors or criteria (described herein), and sending the notifications that indicate the mobile device is available to receive voice calls to each calling party of the multiple additional calling parties based on the assigned response priorities.

In some cases, the system 150 may enable users to configure or set the applications or modes of the mobile device 110 during which notifications are to be sent. For example, a user may wish to send notifications when streaming content (e.g., via Netflix or a podcasting application) without receiving an indication of an incoming call, but may select to receive calls when playing back content already stored on the mobile device, when listening to music on a run, and so on. In some cases, the system 150 may default to sending notifications for all modes or applications in use.

Thus, the mobile device 110 may receive indications of calls placed to the mobile device by other mobile devices, determine the mobile device is operating in an entertainment mode of operation, and send notifications to the other mobile devices when the mobile device finishes operating in the entertainment mode of operation.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

I claim:

1. A non-transitory computer-readable medium whose contents, when executed by a mobile device, cause the mobile device to perform a method of notifying calling parties about a current state of the mobile device, the method comprising:
   receiving, at the mobile device, a voice call initiated by a calling mobile device associated with a calling party;
   determining, via an activity log of an operating system of the mobile device, that the mobile device is currently presenting content to a user of the mobile device,
      wherein the activity log indicates applications or modes of the mobile device, and
      wherein configurable user settings identify applications or modes of the mobile device that, when indicated as active in the activity log, correspond to presenting content;
   sending a first notification to the calling mobile device associated with the calling party that indicates the mobile device is currently presenting content to the user of the mobile device; and
   when the presentation of content ends, sending a second notification to the calling mobile device associated with the calling party that indicates the mobile device is available to receive voice calls.

2. The non-transitory computer-readable medium of claim 1, the method further comprising:
   estimating a remaining duration of the current presentation of content,
      wherein the first notification sent to the calling mobile device associated with the calling party indicates the mobile device is currently presenting content to the user of the mobile device and indicates the estimated remaining duration of the current presentation of content.

3. The non-transitory computer-readable medium of claim 1, the method further comprising:
   identifying the presented content,
      wherein the first notification sent to the calling mobile device associated with the calling party indicates the mobile device is currently presenting content to the user of the mobile device and identifies the presented content.

4. The non-transitory computer-readable medium of claim 1, the method further comprising:
   presenting a local notification to the user along with the current presentation of the content that indicates the calling party initiated the voice call to the mobile device during the current presentation of the content.

5. The non-transitory computer-readable medium of claim 1, wherein the first notification and the second notification are text messages sent from the mobile device to the calling mobile device.

6. The non-transitory computer-readable medium of claim 1, wherein the sending of the second notification includes sending the second notification to the calling mobile device associated with the calling party after the mobile device is determined to be available to receive voice calls after a certain period of time.

7. A method for notifying calling parties about a current mode of operation of a mobile device, the method comprising:
   receiving, at the mobile device, a voice call initiated by a calling mobile device associated with a calling party;
   determining, via an activity log of an operating system of the mobile device, that the mobile device is currently presenting content to a user of the mobile device,
      wherein the activity log indicated active applications or modes of the mobile device, and
      wherein configurable user settings identify applications or modes of the mobile device that, when indicated as active in the activity log, correspond to presenting content;
   sending a first notification to the calling mobile device associated with the calling party that indicates the mobile device is currently presenting content to the user of the mobile device; and
   when the presentation of content ends, sending a second notification to the calling mobile device associated with the calling party that indicates the mobile device is available to receive voice calls.

8. The method of claim 7, further comprising:
   estimating a remaining duration of the current presentation of content;
   wherein the first notification sent to the calling mobile device associated with the calling party indicates the mobile device is currently presenting content to the user of the mobile device and indicates the estimated remaining duration of the current presentation of content.

9. The method of claim 7, further comprising:
   identifying the presented content;
   wherein the first notification sent to the calling mobile device associated with the calling party indicates the mobile device is currently presenting content to the user of the mobile device and identifies the presented content.

10. The method of claim 7, further comprising:
    presenting a local notification to the user along with the current presentation of the content that indicates the calling party initiated the voice call to the mobile device during the current presentation of the content.

11. The method of claim 7, further comprising:
    estimating a remaining duration of the currently presented content; and
    sending the second notification to the calling mobile device associated with the calling party after the estimated remaining duration.

12. The method of claim 7 further comprising:
    determining that the mobile device is in an entertainment mode of operation;
    wherein the first notification sent to the calling mobile device presents information identifying the content presented to the user during the entertainment mode of operation.

13. The method of claim 7, further comprising:
    receiving, at the mobile device, multiple additional voice calls initiated by multiple additional calling mobile devices associated with multiple additional calling parties; and
    assigning a response priority to each calling party of the multiple additional calling parties;
    wherein the sending of the first notification includes sending notifications to each of calling mobile devices based on the assigned response priorities.

14. The method of claim 7, further comprising:
    receiving, at the mobile device, multiple additional voice calls initiated by multiple additional calling mobile devices associated with multiple additional calling parties; and
    assigning a response priority to each calling party of the multiple additional calling parties, wherein the response priority is based on an order in which the multiple additional calling parties initiated the voice calls to the mobile device;

wherein the sending of the first notification includes sending notifications to each of calling mobile devices based on the assigned response priorities.

15. The method of claim 7, further comprising:

receiving, at the mobile device, multiple additional voice calls initiated by multiple additional calling mobile devices associated with multiple additional calling parties; and assigning a response priority to each calling party of the multiple additional calling parties, wherein the response priority is based on a number of instances of which each of the multiple additional calling parties initiated voice calls to the mobile device;

wherein the sending of the first notification includes sending notifications to each of calling mobile devices based on the assigned response priorities.

16. The method of claim 7, further comprising:

receiving, at the mobile device, multiple additional voice calls initiated by multiple additional calling mobile devices associated with multiple additional calling parties; and assigning a response priority to each calling party of the multiple additional calling parties, wherein the response priority is based on a contact list grouping that includes the multiple additional calling parties who initiated voice calls to the mobile device;

wherein the sending of the first notification includes sending notifications to each of calling mobile devices based on the assigned response priorities.

17. A notification method for use with a wireless telecommunications network and mobile device communicating with the wireless telecommunications network, the method comprising:

receiving, via the wireless telecommunications network, indications of calls placed to the mobile device by other mobile devices;

determining that the mobile device is operating in an entertainment mode of operation by accessing one or more activity logs for the mobile device, wherein the one or more activity logs indicate active applications or modes of the mobile device, and wherein configurable user settings identify applications of the mobile device that, when indicated as active in the one or more activity logs, correspond to the entertainment mode of operation;

sending first notifications to the other mobile devices that indicate the mobile device is operating in the entertainment mode of operation; and sending second notifications to the other mobile devices when the mobile device finishes operating in the entertainment mode of operation.

18. The method of claim 17, further comprising:

estimating a remaining duration of the entertainment mode of operation for the mobile device, wherein the first notifications indicate the estimated remaining duration of the entertainment mode of operation, and wherein operating in the entertainment mode of operation includes presenting video content to a user of the mobile device, presenting audio content to the user of the mobile device, or playing a video game using the mobile device.

19. The non-transitory computer-readable medium of claim 1, the method further comprising:

determining, based on user-defined settings that identify approved calling parties, that the calling party is an approved calling party to receive notifications.

20. The non-transitory computer-readable medium of claim 1, the method further comprising:

determining, based on user-defined settings that identify approved calling parties, that the calling party is an approved calling party to receive notifications, wherein the approved calling parties identified in the user-defined settings include calling parties identified in a contact list of the mobile device.

\* \* \* \* \*